INVENTOR
Robert Casper Swaney,
BY John B. Brady
ATTORNEY

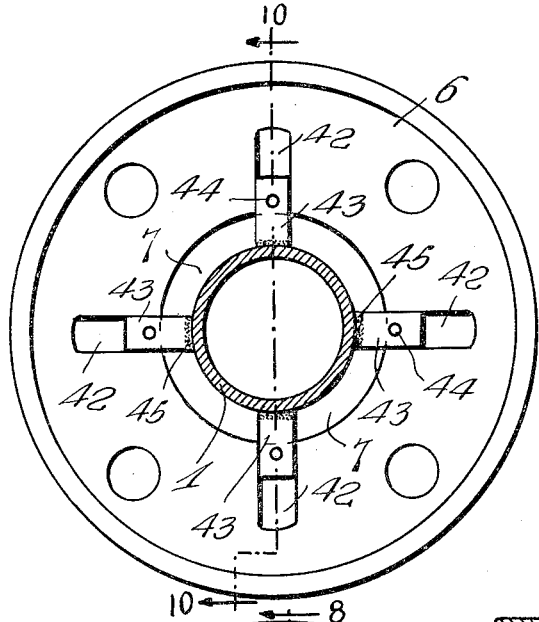
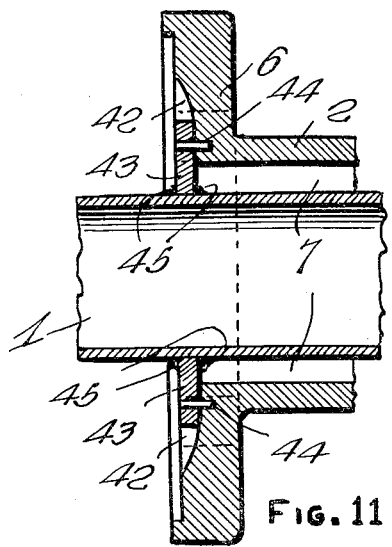
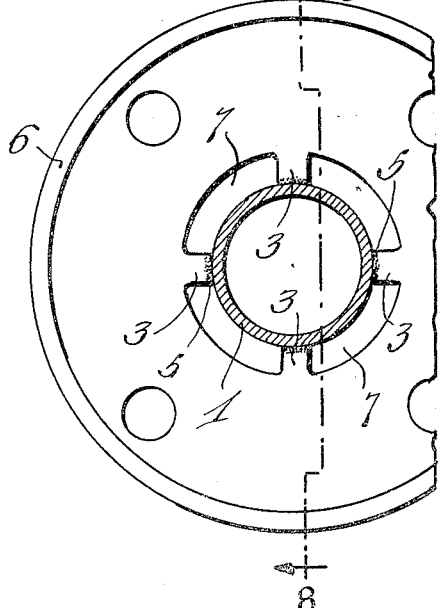
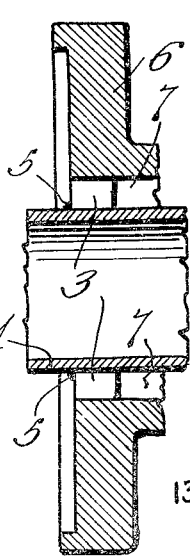
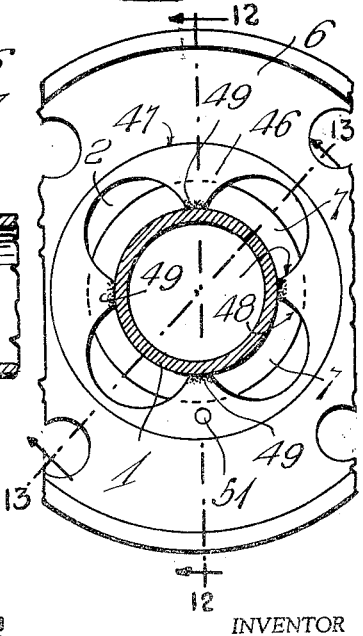

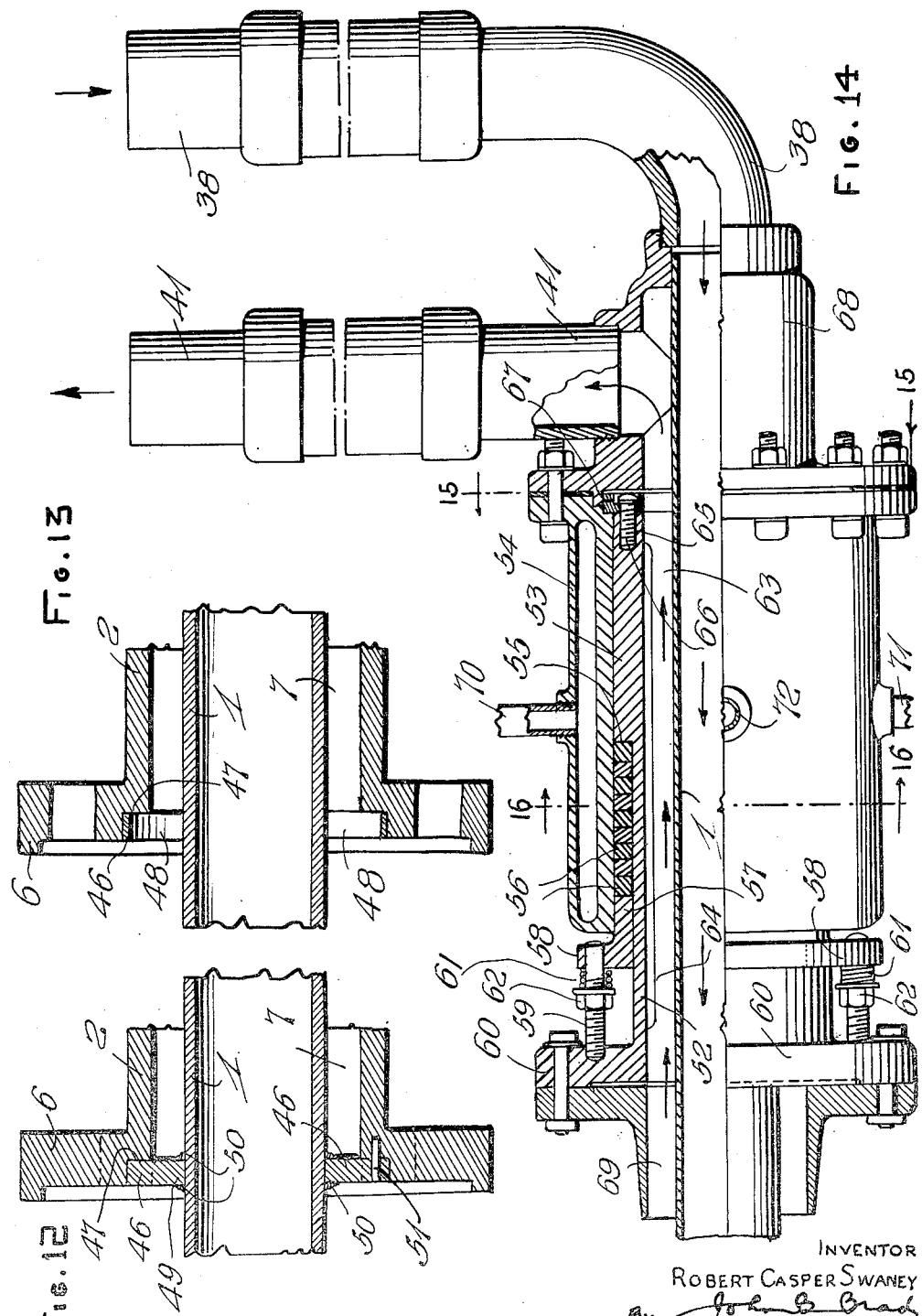

INVENTOR
Robert Casper Swaney,
BY John B. Brady
ATTORNEY

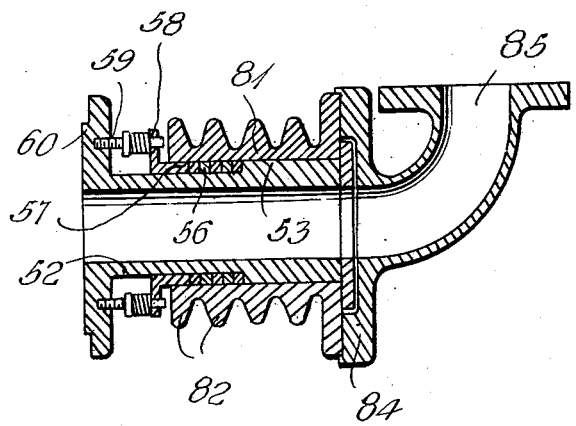
Fig. 22
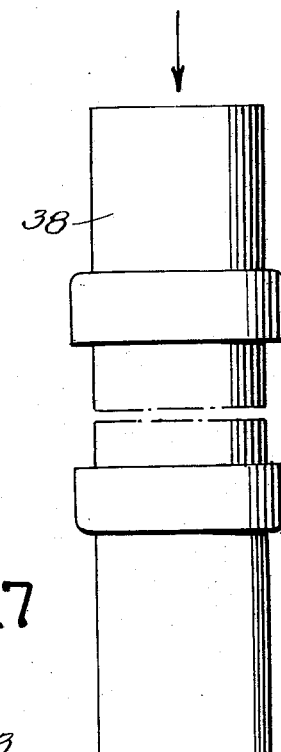
Fig. 17
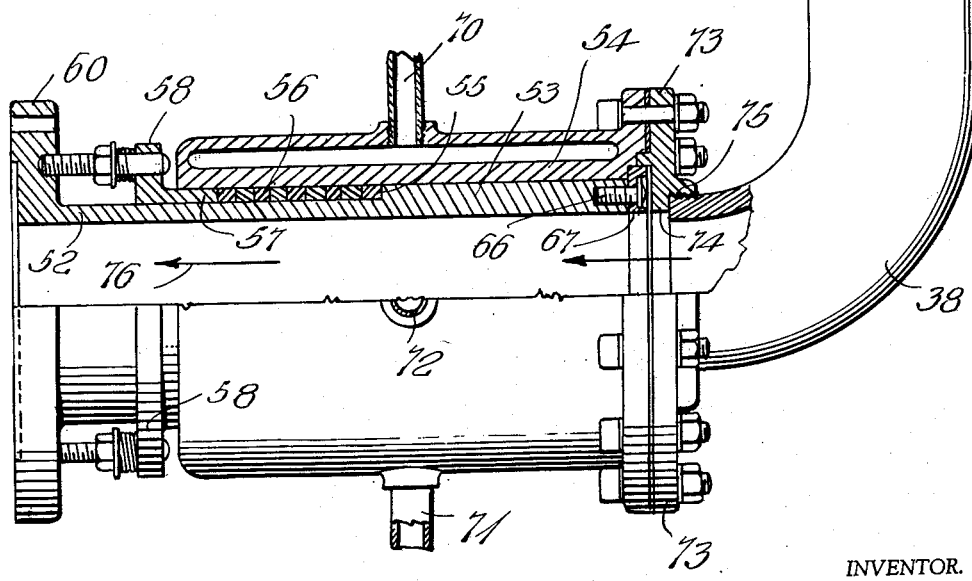
INVENTOR.
ROBERT CASPER SWANEY
BY
ATTORNEY Jan. 16, 1962 R. C. SWANEY 3,017,202
COOLED ROTARY JOINT HAVING A PLURALITY OF
CONCENTRICALLY ARRANGED CONDUITS
Filed March 14, 1958 9 Sheets-Sheet 7
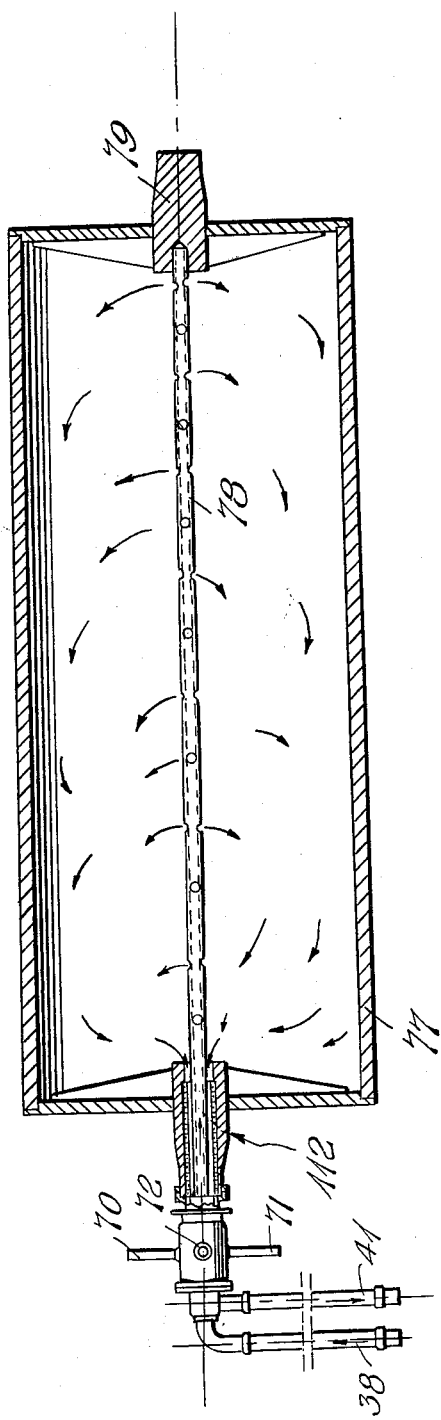
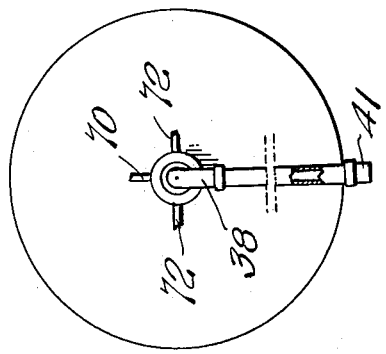
INVENTOR.
ROBERT CASPER SWANEY
BY
John B. Brady
ATTORNEY

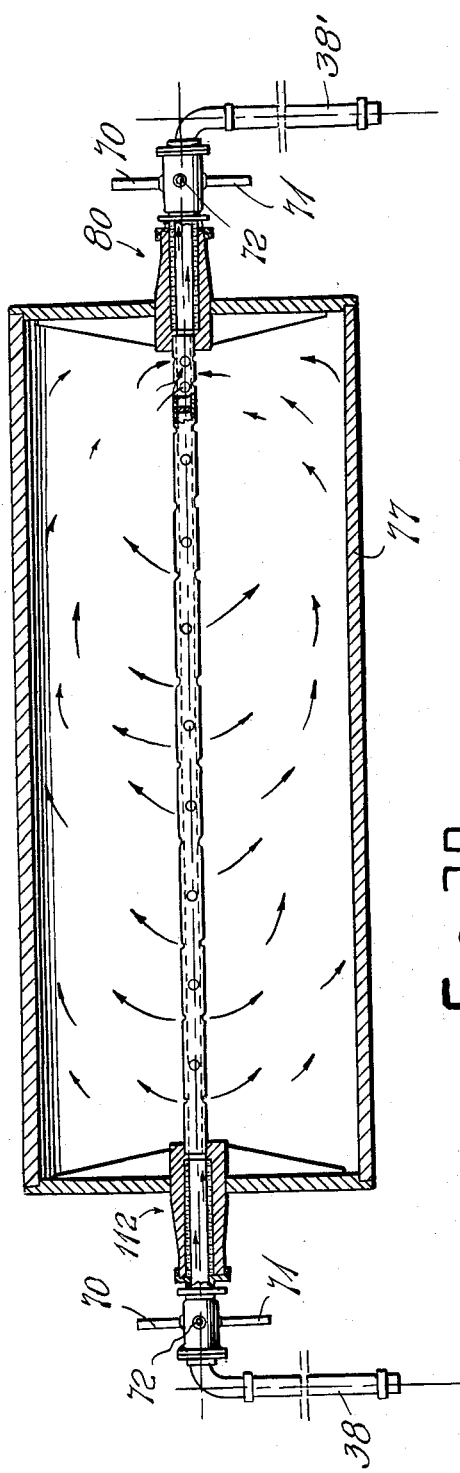
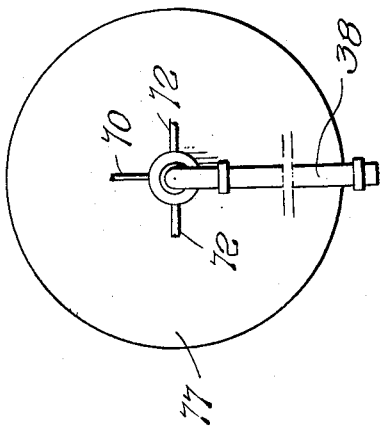

United States Patent Office 3,017,202
Patented Jan. 16, 1962

3,017,202
COOLED ROTARY JOINT HAVING A PLURALITY
OF CONCENTRICALLY ARRANGED CONDUITS
Robert Casper Swaney, 241 Belvedere St.,
Carlisle, Pa.
Filed Mar. 14, 1958, Ser. No. 721,593
10 Claims. (Cl. 285—41)

My invention relates broadly to rotary joints and more particularly to a construction of joint extending between a stationary part and a rotary part for transferring fluid media therebetween.

One of the objects of my invention is to provide an improved structure or connection extending between a stationary part and a rotary apparatus through which a liquid, gas or vapor may be conducted into or out of the apparatus while the joint is maintained at a proper operating temperature.

Another object of my invention is to provide a construction of rotary joint adaptable to either a single ended rotary apparatus or a double ended apparatus for conducting fluid into and out of the rotary apparatus while maintaining the rotary joint at a predetermined operating temperature and insuring a fluid tight seal between the stationary and rotary parts.

Still another object of my invention is to provide a composite structure of rotary joint for effecting transfer of fluid media between a stationary part and a rotary part while providing a packing gland between the parts in combination with means for cooling the packing gland where the fluid media is transferred at high temperature.

Still another object of my invention is to provide a construction of rotary joint for transferring fluid media from a stationary part to a revolvably mounted part including means for dissipating heat from the bearing and sealing faces of the rotary joint and dissipating heat from parts of the rotary joint to minimize the tendency of the fluid media to oxidize at points at which small amounts of the fluid media or lubricant supplied to the joint might come in contact with external air or oxygen.

A still further object of my invention is to provide constructions of rotary joints for transferring heat transfer media from a stationary structure to a revolving structure including parts which are interchangeable to constitute either a single-port or twin-port structure of bearing, packing gland and packing gland adjustment and cooling means for rendering practical the transfer of heat transfer media at a controlled temperature from the stationary structure to the revolving structure.

Other and further objects of my invention reside in the assembly of the parts of a rotary joint and the means for controlling the temperature thereof during transfer of liquid media from a stationary part to a revolving part as set forth more fully in the specification hereinafter following by reference to the accompanying drawings; in which:

FIG. 5 is a fragmentary transverse view taken through the packing gland for adjusting the seal of the packing gland, the view being taken on line 5—5 of FIG. 1;

FIG. 6 is a fragmentary vertical sectional view illustrating the manner in which the packing gland is adjusted to insure a fluid-tight seal in the rotary joint of my invention;

FIG. 7 is a vertical sectional view taken on line 7—7 of FIG. 1;

FIG. 8 is a fragmentary longitudinal sectional view through the rotating parts of the joint taken substantially on line 8—8 of FIG. 7;

FIG. 9 is a view similar to the view shown in FIG. 7 but illustrating a modified arrangement of the rotary parts of the joint;

FIG. 10 is a fragmentary longitudinal sectional view of the rotary parts of the joint of the form of my invention illustrated in FIG. 9, the view being taken substantially on line 10—10 of FIG. 9;

FIG. 11 is a view similar to the views shown in FIGS. 7 and 9 but illustrating another modified arrangement for interconnecting the rotary parts of the joint;

FIG. 12 is a fragmentary longitudinal sectional view taken on line 12—12 of FIG. 11;

FIG. 13 is a fragmentary longitudinal sectional view taken on line 13—13 of FIG. 11;

FIG. 14 is a longitudinal sectional view through a modified form of twin-port rotary joint embodying my invention;

FIG. 17 is a side elevational view of a single-port rotary joint embodying my invention, parts being broken away and illustrated in longitudinal section;

FIG. 18 is a longitudinal sectional view illustrating the application of my invention to a temperature-controlled drying roll, the view showing a twin-port rotary joint in position;

FIG. 19 is an end view looking toward the rotary joint and showing the intake and discharge pipes for the heat transfer media leading to the twin-port rotary joint of FIG. 18;

FIG. 20 is a view similar to the view illustrated in FIG. 18 except that the application of single-port rotary joints are shown in connection with the temperature-controlled drying roll;

FIG. 21 is an end view of the single-port rotary joints used in the drying roll of FIG. 20;

Figure 23:
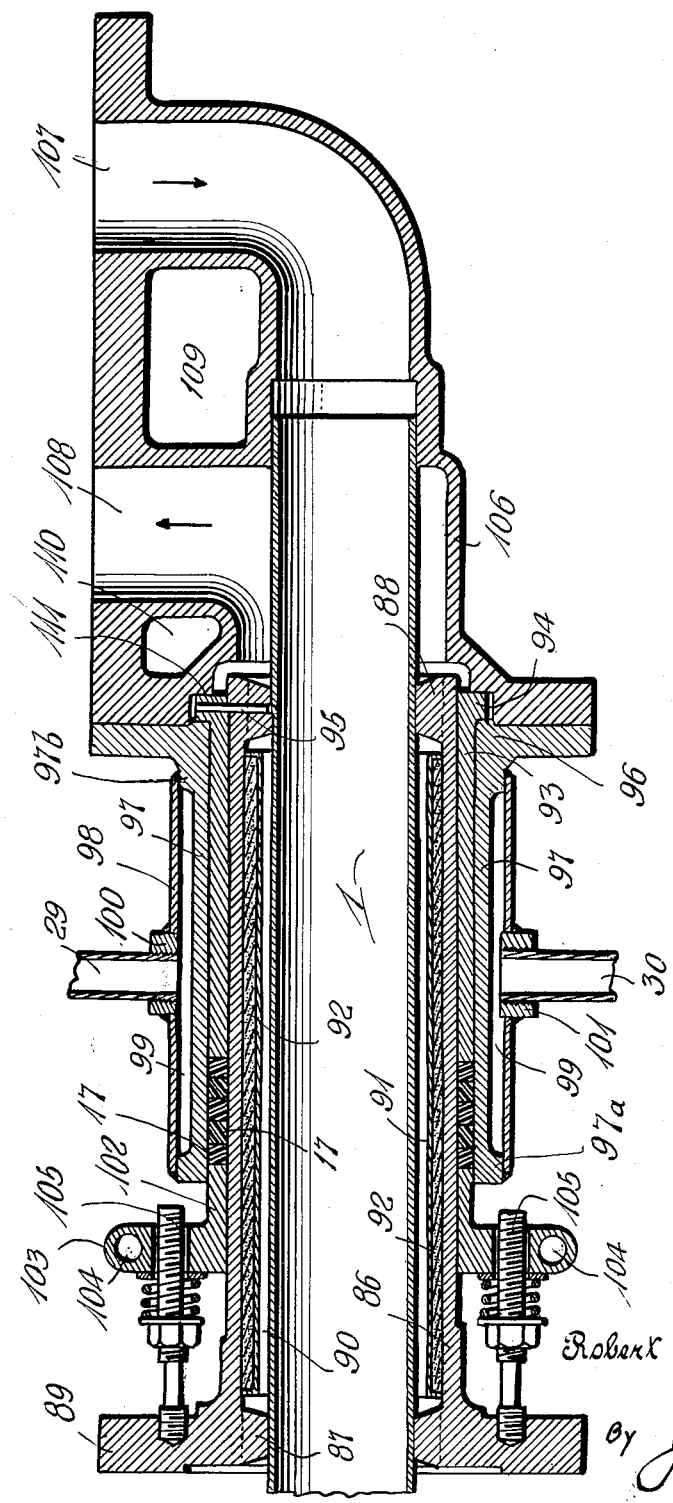

FIG. 22 shows an application of an air-cooled structure to a rotary joint embodying the principles of my invention, and FIG. 23 is a longitudinal sectional view through a further modified form of twin-port rotary joint embodying my invention in which the rotary joint is heat insulated to reduce the rate of heat transfer between the fluid conducted through the rotary joint and the cylindrical members forming the joint.

My invention is directed generally to rotating apparatus or other rotary mechanism through which a temperature controlling medium is circulated from a stationary part to a revolving part. I provide a construction of rotary joint or union which permits a flexible or revolving type connection to be effected between a stationary part or a revolving part through which a liquid, gas or vapor, may be conducted into or out of the rotating apparatus or rotary mechanism. The principal applications of my invention are on such machinery as roll type dryers, Yankee dryers, corrugators and laminators as used in the paper and paper products converting industries; flaking rolls, drying kilns, autoclaves, calenders and like machinery in various chemical and processing industries.

My invention is particularly suitable for conducting heat transfer media into and out of revolving machinery herein referred to, especially for use at the higher temperatures necessary in processes using modern high production machinery. Industry is using more and more liquid heat transfer media such as mineral oils or derivatives therefrom, because higher process temperatures can be obtained with these heat transfer media at much lower pressures. However, since such heat transfer media are basically hydrocarbons, the higher temperatures often present oxidation problems resulting in free carbon being liberated which tends to build up on or cut out the seal surfaces on conventional rotary joints which results in excessive, costly repairs and leakage.

I have found that the best method of maintaining a satisfactory seal when using mineral oils at elevated temperatures is to employ a stuffing box type of seal and adequately cool the seal surfaces, especially at the area of contact with air or oxygen. In all types of seals, a thin film of the heat transfer medium eventually works through the seal surfaces and even though the seal does not leak, the hairline thin edge of that film will oxidize when exposed to air or oxygen at elevated temperatures. There are many commercially available such heat transfer media for use at temperatures of 600° F. or slightly higher, which are relatively stable and acceptably resistant to oxidation at temperatures up to 300° F. Hence, I have perfected my invention to meet these requirements as will be hereinafter more fully understood.

There are two types of my invention: (a) the single-port type which has provision for only one stream of heat transfer medium; and (b) the twin-port type which has provision for two streams of heat transfer medium. The rotary joints of my invention have been developed to meet a need for handling liquid heat transfer media in a manner not heretofore possible. I provide a packing gland for a rotary joint which is adjustable and which is cooled immediately at the bearing surface of the rotary joint. The parts of the joint are interchangeable enabling the joint to be readily assembled in either a single-port type or a twin-port type depending upon the requirements of the rotating equipment. Special provision is made for cooling the adjustable member which adjusts the packing gland to insure the proper control of temperature of the joint.

Referring to the drawings in more detail the preferred form of my invention shown in FIGS. 1–8 illustrates the rotating parts of the rotary joint mounted with the distributor or internal conductor tube 1 leading out from the rotating apparatus such as the drier rolls shown in FIGS. 18–21. The rotating parts of the rotary joint consist of the barrel 2 having inwardly directed fluted flanges 3 and 4 at opposite ends thereof which serve as spacing means for the spacing of the barrel 2 away from the external surface of the distributor or internal conductor tube 1. The flutes 3 are welded at 5 to the outside of the distributor or internal conductor tube 1. The barrel 2 has a transversely extending outwardly directed end flange 6 thereon which bolts to the rotating apparatus such as the end of the drier rolls of FIGS. 18–21. Barrel 2 provides a circulating path for heat transfer medium as represented at 7 spaced around the exterior surface of distributor or internal conductor tube 1 and the internal surface of the barrel 2. The barrel 2 carries at one end thereof the externally arranged retainer ring 8 which is secured to the barrel 2 by drive pins 9 extending radially into the fluted end portion of the barrel shown at 4. A sleeve bearing 10 surrounds the external surface of the barrel 2 and has sufficient clearance at 11 with respect to the barrel 2 to enable barrel 2 to readily revolve within the sleeve bearing 10. Drive pins 12 extend through an inwardly directed flange 13 of the body or stationary part 14 and into one end of the bearing 10 for keying bearing 10 with respect to the stationary part 14. Stationary part 14 is provided with a transversely extending flange 15 and a hollow cylindrical body structure 16 which extends beyond the bearing sleeve 10 spaced from the rotating surface of the barrel 2 by the thickness of the bearing 10. The space between the hollow cylindrical body structure 16 and the external surface of barrel 2 is packed with the packing rings designated at 17 which are compressed by the cylindrical sleeve portion 18 of the packing gland 19. The packing gland 19 projects transversely of the rotary joint and terminates in lugs shown at 20 through which adjustable bolts 21 project, these bolts being secured through aligned lugs 22 carried by the exterior of the body structure 16. The bolts 21 are spring-loaded by means of the coil springs represented at 23 and by adjusting the lock nuts 24 on the bolts 21 as indicated more clearly in FIGS. 2 and 6, the required pressure may be exerted against packing rings 17 for insuring a tight seal between the surface of barrel 2 and the end of sleeve-bearing 10 and the interior surface of the body structure 16. The packing gland 19 is provided with a circular path for the circulation of cooling fluid as indicated at 25 into which cooling fluid is introduced from intake 26 and discharged through discharge pipe 27. Pipes 26 and 27 are sufficiently flexible to permit adjustment of packing gland 19 with respect to the rotary joint in an axial direction.

The body structure 16 is hollow as represented at 28 forming a hollow jacket into which intake pipes 29 extend, and from which discharge pipes 30 project for the circulation of a temperature controlling medium.

The flange 15 of the body structure 16 connects with a flange 31 of the end assembly 32. Flange 31 is coupled to flange 15 by means of bolts 33 as shown. In order to center flange 31 with respect to flange 15 I provide a cylindrical projection 34 on the end of flange 15 which fits into an annular recess 35 in the flange 31. The annular recess 35 is of sufficient depth to receive the retainer ring 8 which braces the end of the barrel 2 and provides a bearing surface against which the retainer ring 8 revolves. The end assembly 32 is also provided with a cylindrical recess 36 in the end thereof in which the end of the distributor or internal conductor tube 1 extends and which provides a bearing surface for the revolving distributor or internal conductor tube 1. The recess 36 is internally screw threaded at the extreme outer end thereof as indicated at 37 into which the intake pipe 38 extends for the circulation of heat transfer media through the distributor or internal conductor tube 1 and through the rotating apparatus for return through flutings 3, cylindrical path 7 and flutings 4 into the interior 39 of the end assembly 32 and outwardly through the discharge opening 40 into which the discharge pipe 41 is screw threaded. By flowing coolant through the intake pipe 26 and out through discharge pipe 27 and through the intake pipes 29 and out through discharge pipes 30 the rotary joint may be maintained at a proper operating temperature regardless of the fact that the heat transfer media circulated through the joint may be at extremely high temperature.

I wish to particularly emphasize the fact that I provide adequate clearances at all of the relatively movable surfaces to eliminate as much as possible appreciable friction and yet to maintain a tight seal. That is to say, running clearances are provided at the locations I have designated: C1, C2, C3, C5, C6, C7, and C8. A thin film of oil or lubricant formed at these zones will be protected against oxidation by reason of the relatively cool temperatures at which the rotary joint operates.

In lieu of the arrangement of flutings 3 and 4 providing the spacer means and the path for the circulation of heat transfer media, I may employ the alternate construction illustrated in FIGS. 9 and 10 where the flange 6 of the rotating part has its end face radially milled to provide slots 42. Into these slots 42 I arranged radially disposed spacing lugs 43 which are fastened to the flange 6 by means of pins 44. The spacing lugs are welded to the surface of distributor or internal conductor tube 1 as represented at 45. Pins 44 serve as drive pins for revolving barrel 2 synchronous with the rotation of the distributor or internal conductor tube 1.

In lieu of the forms of my invention shown in FIGS. 1–8 or 9–10 I may employ another alternate method of construction as shown in FIGS. 11–13 in which a spacer ring 46 is set into a cylindrical recess formed in the end of flange 6 shown at 47. The spacer ring 46 is machined to provide a multiplicity of scalloped openings 48 with lands 49 disposed therebetween machined to the outside diameter of distributor or internal conductor tube 1. These lands are shown in FIGS. 11 and 12 at 49 as tack welded to the outside of distributor or internal conductor tube 1 at 50. The spacer ring 46 and recess 47 are so related that spacer ring 46 fits flush with the end face of flange 6 as shown. Drive pin 51 extends through spacer ring 46 and into the face of flange 6 for driving with barrel 2 as part of the rotative assembly with distributor or internal conductor tube 1.

Figure 1:
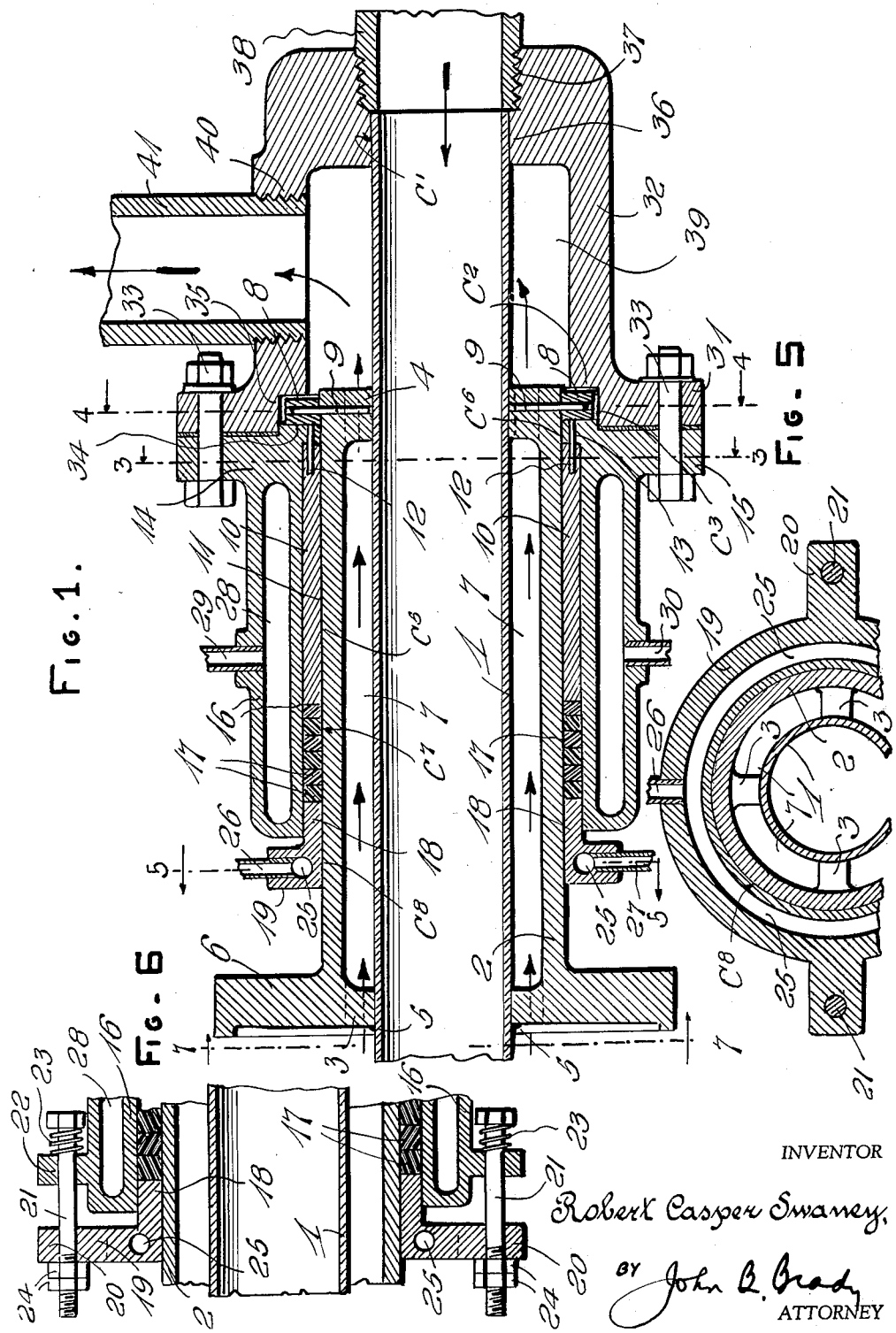
FIG. 1 is a longitudinal cross-sectional view through a preferred twin-port type of rotary joint structure embodying my invention.
Figure 2:
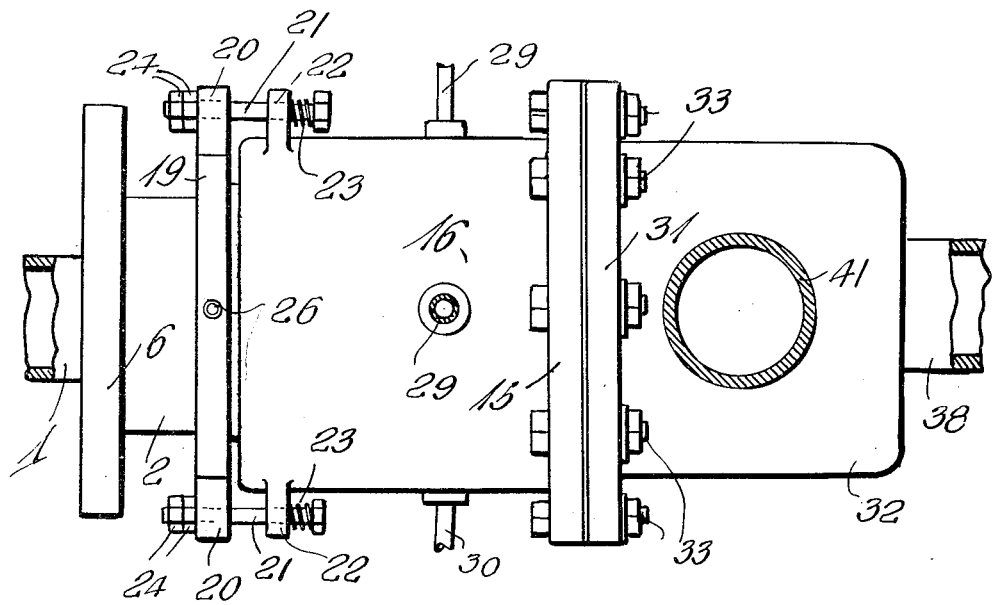
FIG. 2 is a top plan view of the rotary joint of FIG. 1 shown on a smaller scale.
Figures 3, 4:
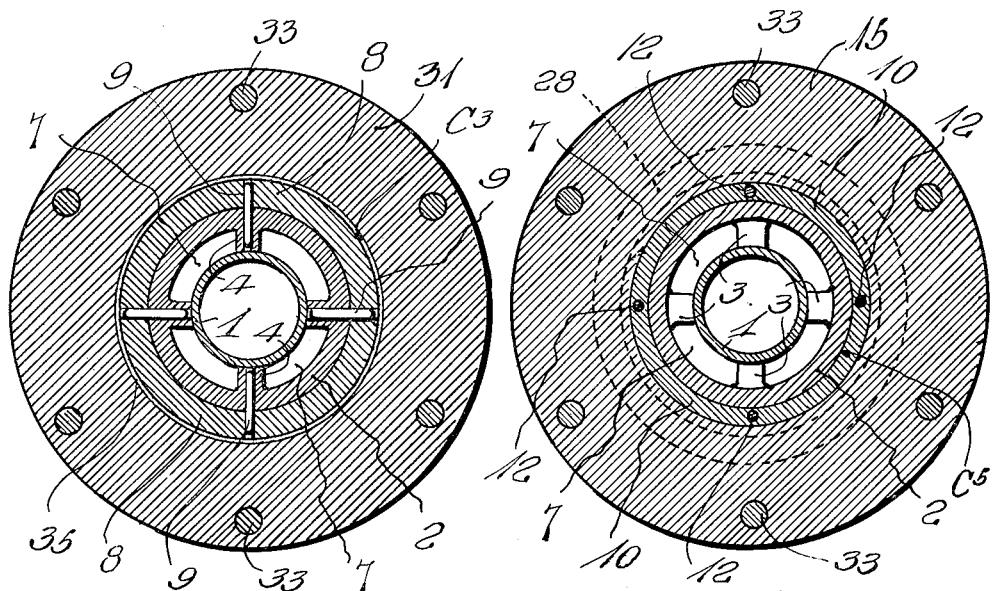
FIG. 3 is a transverse cross-sectional view taken substantially on line 3—3 of FIG. 1 on a smaller scale.
FIG. 4 is a transverse sectional view taken substantially on line 4—4 of FIG. 1 on a smaller scale.
Figure 15:
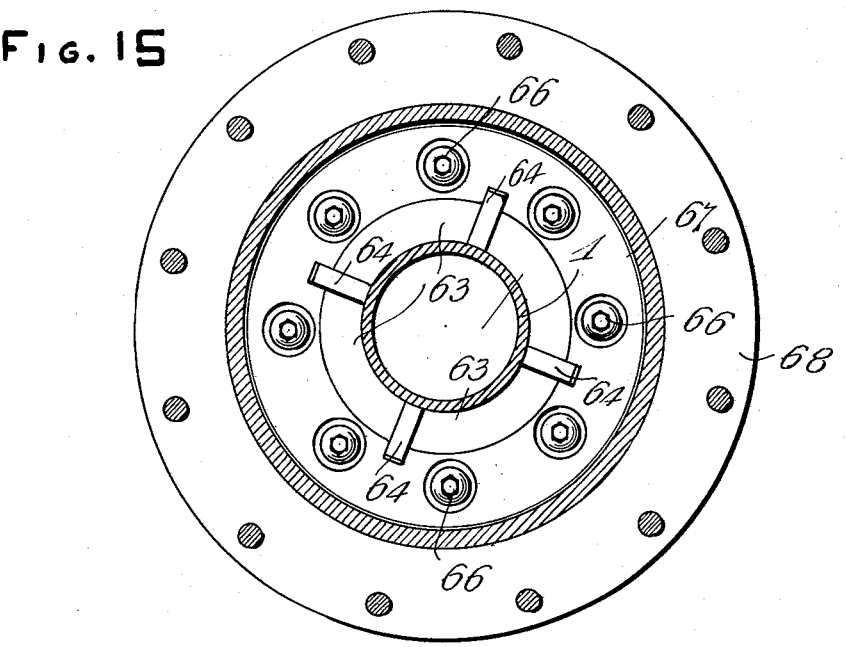
FIG. 15 is a transverse sectional view taken on line 15—15 of FIG. 14.
Figure 16:
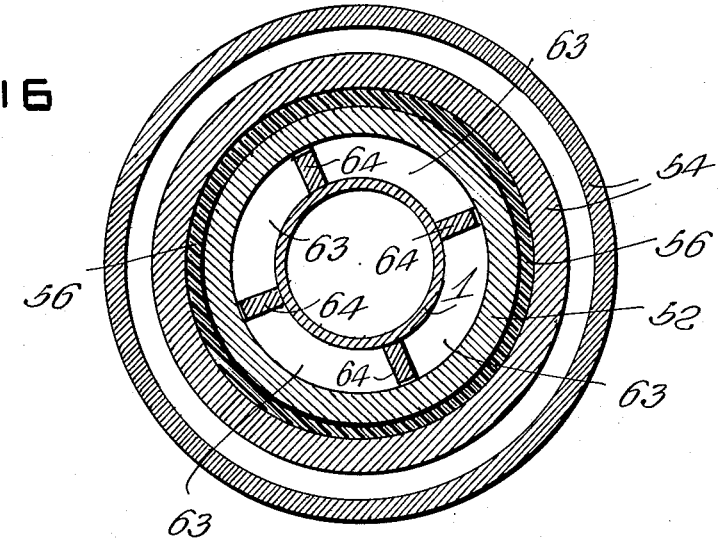
FIG. 16 is a transverse sectional view taken on line 16—16 of FIG. 14.

In FIGS. 14, 15 and 16 I have shown a modified construction of twin-port rotary joint in which the rotary part shown at 52 is provided with a cylindrical bearing surface portion which directly bears against the interior surface of the hollow cylindrical part 54. In this form of my invention the bearing surface 53 is an integral part of the rotary part 52 and provides an annular abutting surface 55 against which the packing rings 56 are compressed by the ring member 57 which is integral with the annular flange 58. Lineally extending screw threaded members 59 are disposed between the flange 60 of the rotary part and the flange 58 of the ring member 57 and are provided with compression springs 61 and adjustment nuts 62 by which screw-threaded members 59 may be rendered variably effective upon the annular flange 58 for advancing or retracting the ring member 57 with respect to the packing rings 56. For purposes of permitting adjustment of the ring member 57 the screw-threads on screw-threaded members 59 extend over only that part of the length of screw-threaded members 59 required for operating and adjusting adjustment nuts 62 and the part of the members 59 extending through annular flange 58 have a smooth external cylindrical surface and slidably pass through aligned apertures in the annular flange 58 thereby permitting a lineal cushioned adjustment of the ring member 57 with respect to the packing 56.

In the form of my invention shown in FIGS. 14, 15 and 16 the passage 63 for the heat transfer media is divided into quadrantal areas by means of radially disposed guides or vanes 64 shown more clearly in FIGS. 15 and 16 arranged as shown. The end of the bearing surface 53 is provided with a spaced series of screw-threaded openings 65 into which screw-threaded members 66 extend and secure an annular retainer ring 67 in position. The retainer ring revolves with the rotary assembly and bears against the end of the hollow cylindrical structure 54 as shown. The balance of the structure is similar to the arrangement described in connection with the form of my invention shown in FIGS. 1–8 in that an end assembly 68 is provided bolted through an end flange with the hollow cylindrical structure 54 and providing connections for the intake pipe 38 and the discharge pipe 41 as shown. The path for the flow of the heat transfer media is similar to that explained in connection with FIGS 1–8. That is to say, the heat transfer media is introduced into the rotary apparatus which connects to coupling 69 and the distributor or internal conductor tube 1 through the interior of the distributor or internal conductor tube 1 returning through the path 63 and through the discharge pipe 41.

In FIG. 17 I have shown the assembly of FIGS. 14–16 applied to a single-port rotary joint. It will be seen that all of the parts are the same as those embodied in the assembly of FIGS. 14–16 including the connections for the coolant indicated as intake connection 70 and discharge connection 71 with additional connections shown at 72. In the single-port structure of FIG. 17 the coupling flange 73 is provided with a central opening 74 and is internally screw-threaded at 75. The intake pipe 38 connects with the screw-threaded connection 75 and is directly aligned with the path leading to the intake of the rotary apparatus indicated in the direction of arrow 76. Thus for twin-ported structures and single-ported structures replacement parts are interchangeable.

In FIGS. 18 and 19 I have shown the application of the twin-ported rotary joint of my invention to a drier roll 77 having journals at opposite ends of the roll for rotatably mounting the roll as represented at 112 and 79. The heat transfer media is introduced into the roll through the rotary joint as represented in FIG. 18 through one end of the roll through intake pipe 38 and through distributor pipe 78 returning in a path concentrically surrounding the intake pipe and discharging through discharge pipe 41.

In the form of my invention shown in FIGS. 20–21 the drier roll 77 is shown mounted for receiving the heat transfer media through one end of the roll as represented at 112 and discharging the heat transfer media through the opposite end of the roll as represented at 80. In this arrangement the form of my invention shown in FIG. 17 is utilized where the central pipe 38 at the left hand end of the drier serves as the intake pipe for the heat transfer media while the central pipe 38′ serves as the discharge pipe for the heat transfer media after circulation through the drier roll 77.

FIG. 22 illustrates a further form of my invention where air cooling of the rotary joint is obtained. In this arrangement the rotary parts are arranged as explained in connection with FIGS. 14–17 and fit within a stationary part shown at 81 which is in the form of a cylindrical housing having a running clearance with the rotating surface 53 of the rotating part. However, the outside surface of the stationary part 81 is provided with a plurality of heat radiating or dissipating fins 82 which directly disseminate heat as it arises in the rotary joint. In this arrangement it is unnecessary to provide a liquid coolant as dissipation of heat is effected by radiation from the fins 82. The part 81 is connected to the stationary part of the rotary joint through flange 84 and discharge pipe 85. Discharge pipe 85 may be reversably used as an intake pipe and the point of the disclosure in FIG. 22 is to show the application of heat radiating means in a rotary joint as distinguished from the circulation of a coolant through the stationary parts of the rotary joint.

While I have described the several forms of my invention in connection with heat transfer media I desire that it be understood that my invention is also applicable to the use of refrigerants. The fluid jackets or radiating fins function to transfer heat out of the rotary joint when it is used to conduct hot fluids and to transfer heat into the rotary joint when it is used to conduct cold fluids.

Where problems of temperature arise as alluded to in the foregoing paragraph, I find it desirable to substantially thermally insulate the rotary joint. This may be accomplished in a number of ways, one of which I have illustrated in the modified form of my invention shown in FIG. 23. In this arrangement the internal surface of the inner disposed cylindrical member is insulated to reduce the heat flow through the two cylindrical members to assure the lowest practical temperatures at the bearing and stuffing box. In this modified arrangement I have shown the distributor or internal conductor tube 1 leading out from the rotating apparatus through the barrel 86. In this form of my invention sleeve 97 is provided with an end flange 96 forming part of the stationary assembly. The cylindrical bearing 93 coacting with packing material 17 forms a journal for the exterior of the barrel 86 and the end of the cylindrical end portion 102, and revolves therewith, the barrel 86 being spaced from the external surface of tube 1 by means of fluted flanges 87 and 88 at opposite ends of the barrel 86. The fluted flanges 87, 88 are welded to the internal conductor tube 1. The interior surface of barrel 86 is spaced from the external surface of the internal conductor tube 1 to provide the circulating path indicated at 90. A metallic cylindrical shield 91 is disposed within space 90 leaving a cylindrical gap with respect to the surface of the internal conductor tube 1, as shown in FIG. 23. The metallic shield 91 serves to support and contain insulation material shown at 92, such as mineral wool, 85 percent magnesia, or equal, which is packed against the interior surface of barrel 86.

A metallic sleeve bearing 93 extends over the barrel 86 for a portion of the length thereof and provides an annular abutment for the packing rings 17 which fill the space between the cylindrical stationary part 96 of the bearing and the exterior surface of the barrel 86. The sleeve bearing 93 carries an annular flange 94 on one end thereof which serves as the bearing means with respect to the stationary fitting shown at 106. The flange 94 connects through drive pin 95 to the barrel 86 immediately over the fluted flange 88 thereof so that internal conductor tube 1, barrel 86, sleeve bearing 93, packing 17 and the associated packing gland 103 all revolve as a unit.

The stationary part of the rotary joint is constituted by the cylindrical sleeve 97 which is reduced in section between the opposite end flanges thereof indicated at 97a and 97b for providing an annular cylindrical jacket 99 which is closed by a cylindrical cover 98 extending between the end flanges 97a and 97b. The cylindrical cover 98 supports screw-threaded connectors 100 and 101 into which pipes 29 and 30 extend and serve to convey temperature control media around the hollow jacket 99 for controlling the temperature of the rotary joint. The packing gland 103 includes a cylindrical sleeve portion 102 which is resiliently urged against the packing rings 17 between the stationary part 97 and the rotating sleeve bearing 93, as more clearly shown in FIG. 23. Adjustment may be made with respect to the spring tension exerted against packing ring 17, as shown, by adjustment of screw-threaded members 105 which operate with respect to the circular flange 89, connected to the end of barrel 86. The packing gland 103 is provided with a peripheral path 104 therein for the circulation of cooling fluid. The rotary joint operates with respect to stationary fitting 106 having an intake connection 107 and a discharge connection 108. 109 and 110 indicate cored holes to lighten the casting for end fitting 106. The fitting 106 is provided with an annular recess 111 which provides guide means for the rotation of annular flange 94 on the rotary sleeve bearing 93. The shield 91 with the heat insulation material 92 confined therein operates as a barrier for reducing the heat flow through the two cylindrical members constituting the rotary joint.

While I have described my invention in certain of its preferred embodiments I realize that modifications may be made and I desire that it be understood that no limitations upon my invention are intended, other than may be imposed by the scope of the appended claims.

What I claim as new and desire to secure by Letters Patent of the United States is as follows:

1. A rotary joint for conducting fluid comprising an axially extending revolving tube for fluid, an inner cylindrical member having inwardly extending supports with fluid passageways therein at opposite ends thereof connected with said tube, said inner cylindrical member being spatially concentrically related to said tube intermediate said supports, a sleeve bearing disposed concentrically over the cylindrical surface of said inner cylindrical member and extending in an axial driection for a portion of the length of said inner cylindrical member, an outer cylindrical member concentrically surrounding said sleeve bearing and extending beyond the terminating end thereof, sealing means disposed in the annular space between said inner and outer cylindrical members and aligned with said sleeve bearing, a stuffing box including a cylindrical sleeve extending into the annular space between said inner and outer cylindrical members in alignment with said sleeve bearing, means extending between one end of said inner cylindrical member and said stuffing box for yieldably adjusting the annular sleeve of said stuffing box against said sealing means for establishing a substantially fluid tight seal between said inner and outer cylindrical member, means securing said sleeve bearing to said outer cylindrical member whereby said inner cylindrical member revolves within said sleeve member, said sealing means, and the cylindrical sleeve of said stuffing box and means connected with said outer cylindrical member and forming a bearing for the end of said revolving tube for providing fluid intake and discharge connections with respect to said tube, and with respect to the annular space formed by the spatial concentric relation of said inner cylindrical member and said tube revolving.

2. A rotary joint for conducting fluid as set forth in claim 1, in which the supports with fluid passageways therein are constituted by flutings extending between opposite ends of the interior wall of said inner cylindrical member and the exterior surface of said revolving tube for establishing passages for fluid longitudinally of the exterior surface of said tube and into the interior of said means connected with said outer cylindrical member.

3. A rotary joint for conducting fluid as set forth in claim 1, in which radially disposed vanes extend longitudinally through the space between the inner cylindrical member and the surface of the revolving tube for dividing said space into a plurality of paths for directing the passage of heat transfer medium.

4. A rotary joint for conducting fluid as set forth in claim 1 which includes a cylindrical heat shield interposed in the heat conduction path through said inner and outer cylindrical members for reducing the transfer of heat therebetween.

5. Apparatus according to claim 1 in which said axially extending tube carries supply fluid through said rotary joint and the space between said tube and said inner cylindrical member carries exhaust fluid through said joint.

6. A rotary joint for conducting fluid comprising a pair of concentrically arranged inner and outer cylindrical members, said inner member being revolvable within said outer member, a portion of each of the respective external and internal cylindrical surfaces of said members operating as a bearing between the said members, a further and adjacent portion of said respective external and internal cylindrical surfaces of said members being spatially concentrically related, a sealing means disposed within the space between said spatially concentric related portion of said members, a packing gland having a cylindrical sleeve portion lineally slidable between the spatially concentrically related portions of said members in annular abutment with said sealing means for adjusting said sealing means between the spatially concentric related portions of said members, a fluid circulating jacket around said outer member through which to circulate a heat transfer fluid to transfer heat between the said heat transfer fluid and sealing means and said bearing surfaces, means for maintaining the longitudinal alignment of said inner and outer cylindrical members with respect to each other, an axially extending revolvable tube disposed concentrically within said cylindrical members and projecting therethrough, means securing said inner member to said tube, an end assembly containing an annular bearing surface interiorly thereof for receiving and journaling the projecting end of said axially extending revolvable tube, an intake connection in said end assembly aligned with the axis of said tube, another connection in said end assembly, and means securing said end assembly to the outer cylindrical member.

7. A rotary joint for conducting fluid comprising a pair of concentrically arranged inner and outer cylindrical members, said inner member being revolvable within said outer member, a portion of each of the respective external and internal cylindrical surfaces of said members operating as a bearing between the said members, a further and adjacent portion of said respective external and internal cylindrical surfaces of said members being spatially concentrically related, a sealing means disposed within the space between said spatially concentrically related portions of said members, a packing gland having a cylindrical sleeve portion lineally slidable between the spatially concentrically related portions of said members in annular abutment with said sealing means for adjusting said sealing means between the spatially concentric related portions of said members, a fluid circulating jacket around said outer member through which to circulate a heat transfer fluid to transfer heat between the said heat transfer fluid and said sealing means and said bearing surfaces, an axially extending revolvable tube disposed concentrically within said cylindrical members and projecting therethrough, means securing said inner member to said tube, an end assembly containing an annular bearing surface interiorly thereof for receiving and journaling the projecting end of said axially extending tube, a fluid intake connection in said end assembly aligned with said tube, a fluid discharge connection in said end assembly, a ring member secured to the end of the inner cylindrical member, an aligned annular bearing surface on the end of the outer cylindrical member, an annular recess disposed internally of said end assembly, said annular bearing surface and said annular recess forming bearing surfaces for said ring member as said inner cylindrical member revolves within said outer cylindrical member to maintain the longitudinal alignment of said inner and outer cylindrical members with respect to each other, and means securing said end assembly with respect to said outer cylindrical member.

8. A rotary joint for conducting fluid comprising a pair of concentrically arranged inner and outer cylindrical members, said inner member being revolvable within said outer member, an axially elongated portion of each of the respective external and internal cylindrical surfaces of said members operating as an elongated sleeve bearing between the said members, a further and axially adjacent portion of said respective external and internal cylindrical surfaces of said members being spatially concentrically related, a sealing means disposed within the space and between said spatially concentrically related portions of said members, a packing gland having a cylindrical sleeve portion lineally slidable between the spatially concentrically related portions of said members in annular abutment with said sealing means for adjusting said sealing means between the spatially concentrically related portions of said members, means disposed within said inner revolvable member and spaced from the inner wall surfaces thereof providing a passage for hot fluids through said inner revolvable member and rotatable therewith, a fluid circulating jacket around said outer member through which to circulate a heat transfer fluid to transfer heat from said passage between the said heat transfer fluid and said sealing means and said sleeve bearing surfaces, and means affixed to one of said inner and outer cylindrical sleeve members in thrust bearing engagement with the other cylindrical member for maintaining the longitudinal alignment of said inner and outer cylindrical members with respect to each other.

9. A rotary joint for conducting fluid comprising a pair of concentrically arranged inner and outer cylindrical members, said inner member being revolvable within said outer member, a portion of each of the respective external and internal cylindrical surfaces of said members operating as a bearing between the said members, a further and adjacent portion of said respective external and internal cylindrical surfaces of said members being spatially concentrically related, a sealing means disposed within the space between said spatially concentrically related portions of said members, a packing gland having a cylindrical sleeve portion lineally slidable between the spatially concentrically related portions of said members in annular abutment with said sealing means for adjusting said sealing means between the spatially concentrically related portions of said members, means disposed within said inner revolvable member and spaced from the inner wall surfaces thereof providing a passage for fluids through said inner revolvable member and revolvable therewith, a fluid circulating jacket around said outer member through which to circulate a heat transfer fluid to transfer heat from the passage between the said heat transfer fluid and said sealing means and said sleeve bearing surfaces, an annular bearing surface on one of said inner and outer cylindrical members, a coacting bearing ring carried by the other of said inner and outer cylindrical members and forming a thrust bearing surface with respect to said annular bearing surface, and said thrust bearing surface and said annular bearing surface maintaining the longitudinal alignment of said inner and outer cylindrical members with respect to each other.

10. A rotary joint for conducting fluid comprising a pair of concentrically arranged inner and outer cylindrical members, said inner member being revolvable within said outer member, a portion of each of the respective external and internal cylindrical surfaces of said members operating as a bearing between the said members, a further and adjacent portion of said respective external and internal cylindrical surfaces of said members being spatially concentrically related, a sealing means disposed within the space between said spatially concentrically related portions of said members, a packing gland having a cylindrical sleeve portion lineally slidable between the spatially concentrically related portions of said members in annular abutment with said sealing means for adjusting said sealing means between the spatially concentrically related portions of said members, means disposed within said inner revolvable member and spaced from the inner wall surfaces thereof providing a passage for hot fluid through said inner revolvable member and revolvable therewith, a heat circulating jacket around said outer member through which to circulate a heat transfer fluid to transfer heat from said passage between the said heat transfer fluid and said sealing means and said sleeve bearing surfaces, means for maintaining the longitudinal alignment of said inner and outer cylindrical members with respect to each other, an end assembly detachably connected with said outer member having an intake connection joined with said passage and a discharge connection receiving fluids from said inner member, and means securing said end assembly to said outer member in a position to envelop the ends of said cylindrical members.

References Cited in the file of this patent

UNITED STATES PATENTS

| 686,598 | Evans | Nov. 12, 1901 |
| 1,288,631 | McFarland | Dec. 24, 1918 |
| 1,523,822 | Marret | Jan. 20, 1925 |
| 1,535,209 | Dubbs | Apr. 28, 1925 |
| 1,872,665 | Brownell | Aug. 23, 1932 |
| 1,991,432 | Valentine | Feb. 19, 1935 |
| 2,125,703 | Williams | Aug. 2, 1938 |
| 2,230,881 | Browne | Feb. 4, 1941 |
| 2,349,696 | Behrens | May 23, 1944 |
| 2,691,460 | Barnebey | Oct. 12, 1954 |
| 2,799,522 | King | July 16, 1957 |

FOREIGN PATENTS

| 479,152 | Germany | Aug. 7, 1926 |